(12) United States Patent
Frades

(10) Patent No.: US 7,431,318 B1
(45) Date of Patent: Oct. 7, 2008

(54) COMBINED TRAILER HITCH BALL ASSEMBLY AND ALIGNMENT ACCESSORY FOR VEHICLES

(76) Inventor: Gerald J. Frades, 314 E. Rudy Streets, Oakley, CA (US) 94561

( * ) Notice: Subject to any disclaimer, the term of this patent is extended or adjusted under 35 U.S.C. 154(b) by 412 days.

(21) Appl. No.: 11/238,210

(22) Filed: Sep. 29, 2005

(51) Int. Cl.
*B60D 1/40* (2006.01)

(52) U.S. Cl. .................................... 280/477; 116/28 R

(58) Field of Classification Search ................ 280/477; 33/264; 116/28 R
See application file for complete search history.

(56) References Cited

U.S. PATENT DOCUMENTS

| | | | | |
|---|---|---|---|---|
| 3,818,599 A | * | 6/1974 | Tague | 33/264 |
| 4,666,176 A | * | 5/1987 | Sand | 280/477 |
| 4,911,594 A | * | 3/1990 | Fisher | 411/437 |
| 5,113,588 A | * | 5/1992 | Walston | 33/264 |
| 5,478,101 A | * | 12/1995 | Roberson | 280/477 |
| 5,680,706 A | | 10/1997 | Talcott | |
| 5,927,229 A | | 7/1999 | Karr, Jr. | |
| 5,970,619 A | | 10/1999 | Wells | |
| 6,139,041 A | | 10/2000 | Murphy | |
| 6,209,902 B1 | | 4/2001 | Potts | |
| 6,273,448 B1 | * | 8/2001 | Cross | 280/477 |
| 6,341,794 B1 | * | 1/2002 | Hunter | 280/477 |
| 6,517,098 B2 | | 2/2003 | Grasso et al. | |
| 6,712,378 B1 | * | 3/2004 | Austin | 280/477 |
| 6,834,878 B2 | * | 12/2004 | Koestler | 280/477 |
| 6,916,109 B2 | * | 7/2005 | Julicher | 362/487 |

* cited by examiner

*Primary Examiner*—Kevin Hurley

(57) ABSTRACT

An alignment assembly includes first and second markers that have shafts provided with opposed ends. Each shaft has a bottom end situated below an operator's line of sight and top end situated within the operator's line of sight such that the operator can identify a location of the markers. The first marker is seated on the rear of the vehicle hitch. The second marker is seated on a proximal end of the trailer hitch. Each marker has a diameter less than a width of the vehicle and trailer hitches so that the markers maintain continuous surface area contact therewith. A mechanism is included for locking the second marker at a static position. The locking mechanism is spaced from the first marker and independently operable therefrom. The vehicle operator can determine when the vehicle and trailer hitches are aligned by aligning the first and second markers in a linear relationship.

14 Claims, 4 Drawing Sheets

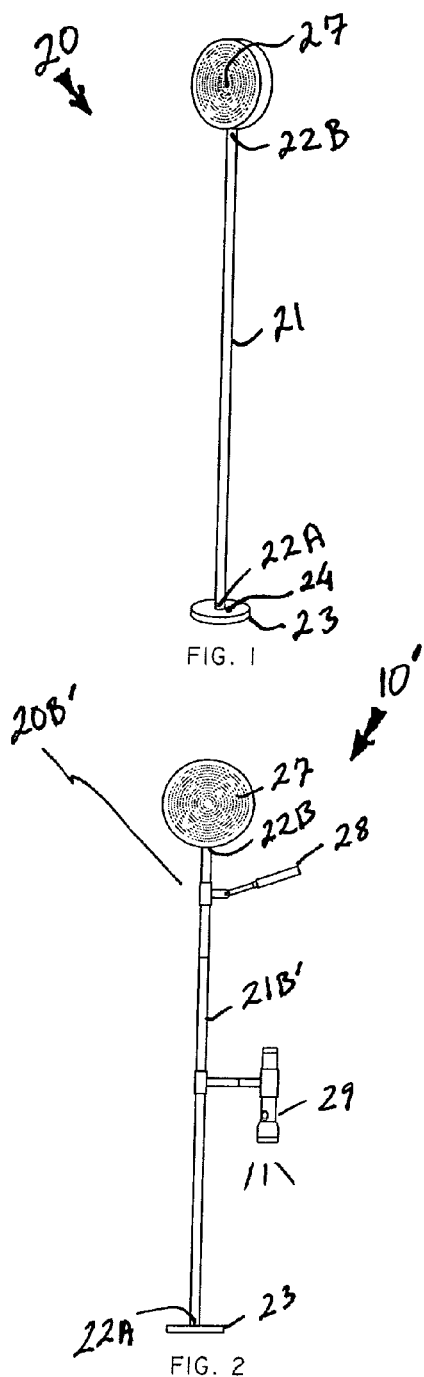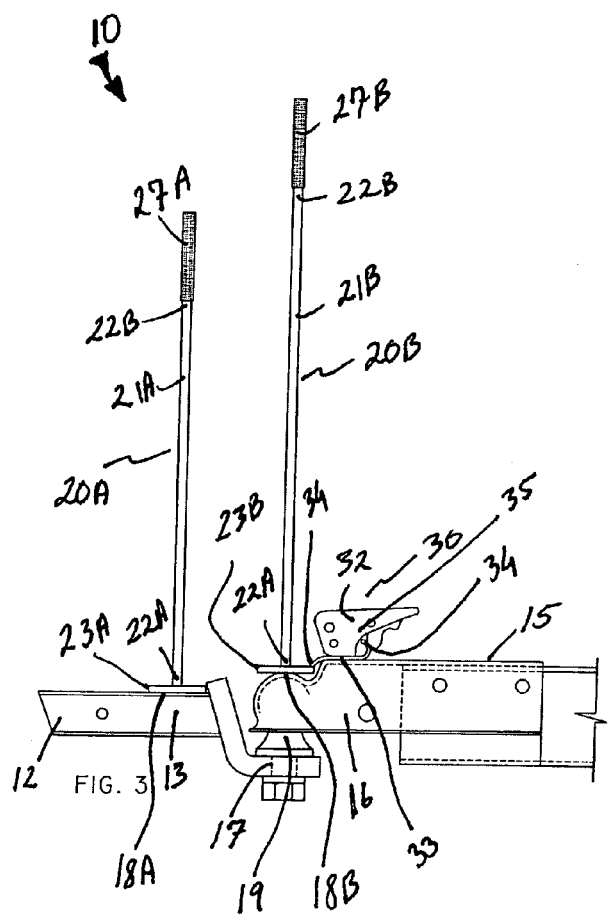

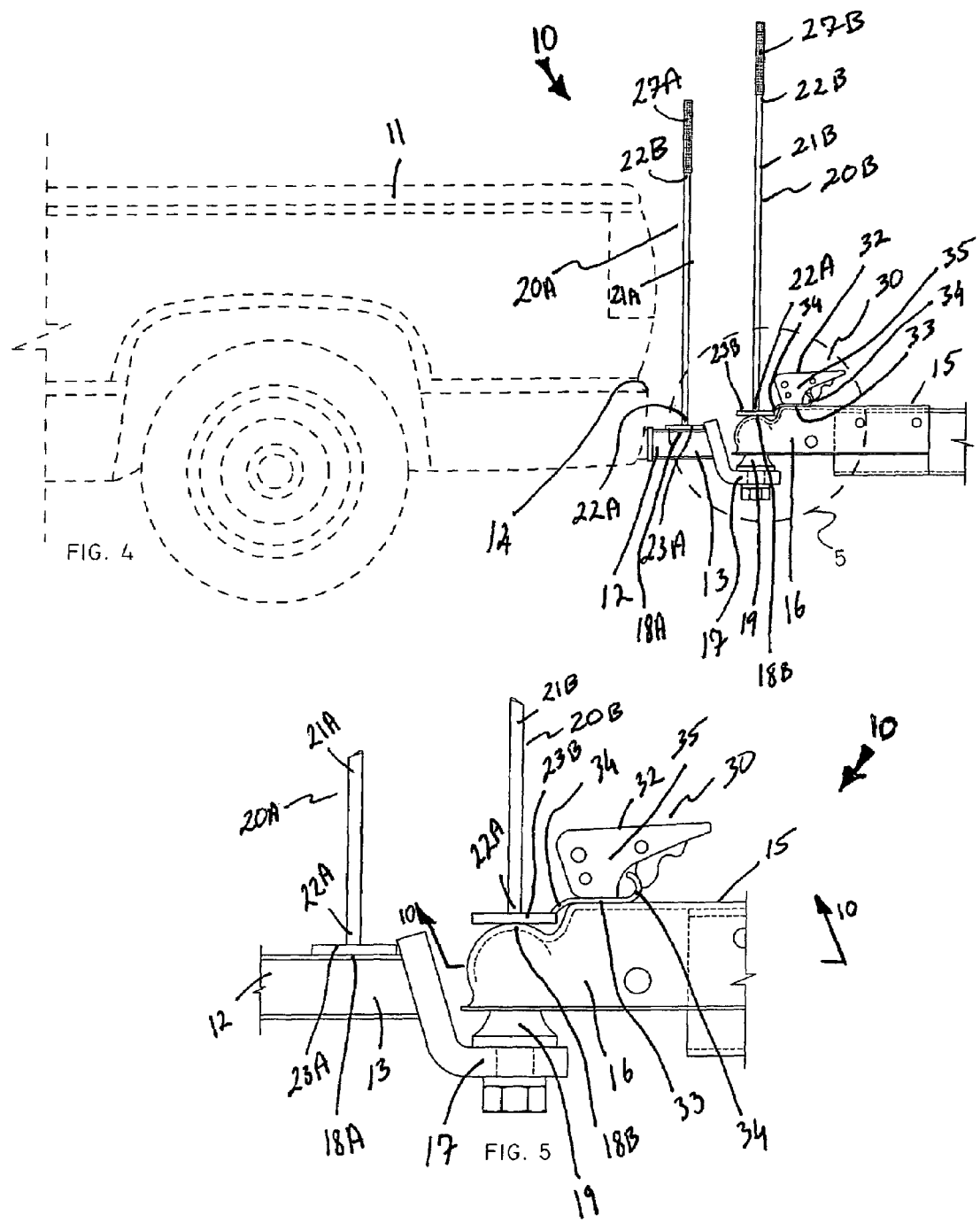

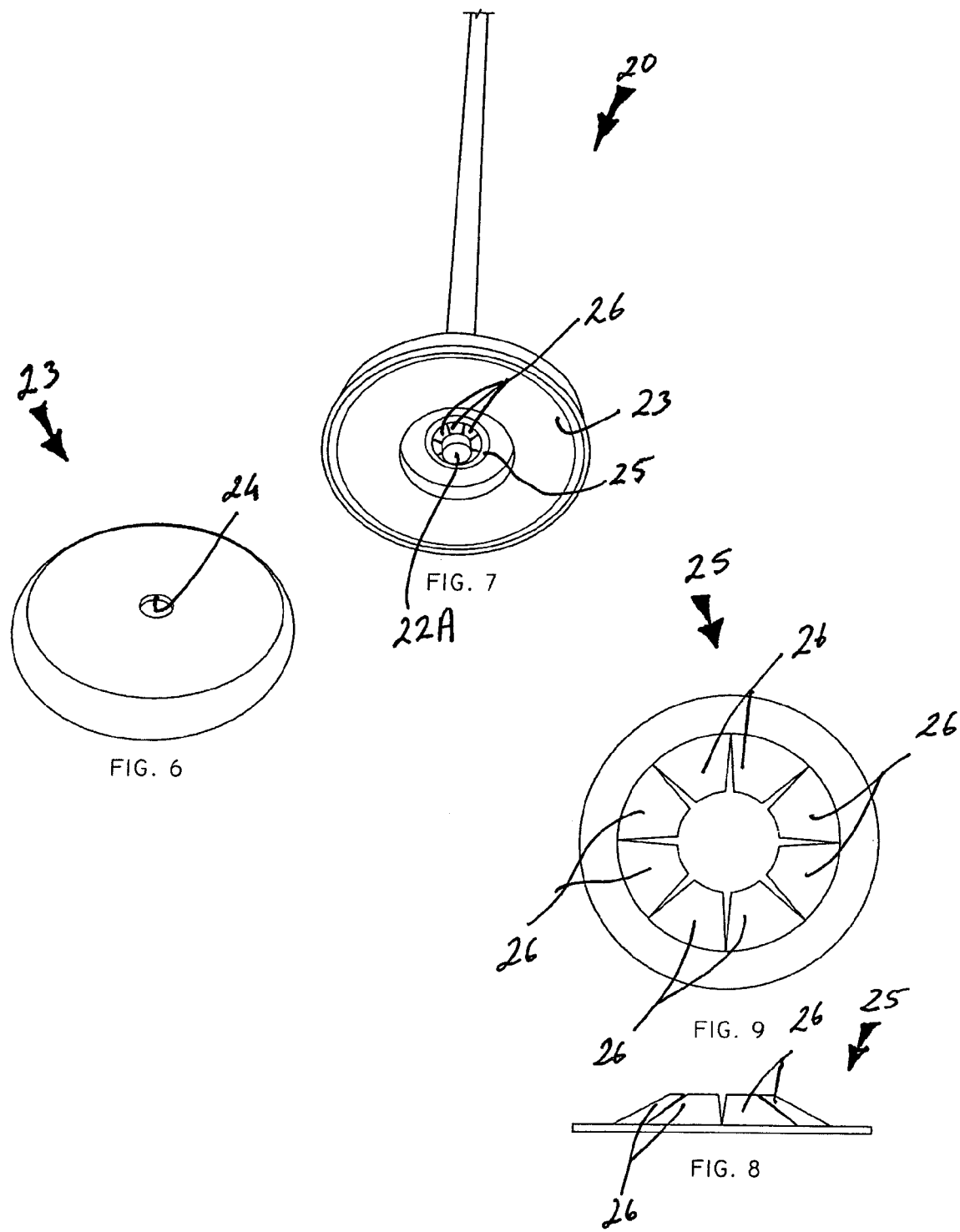

COMBINED TRAILER HITCH BALL ASSEMBLY AND ALIGNMENT ACCESSORY FOR VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to trailer hitch ball assemblies and, more particularly, to a combined hitch ball assembly and alignment accessory for tractors and the like.

2. Prior Art

In recent years the recreational boating industry has witnessed an explosion of new enthusiasts and purchasers of relatively small fishing and sport boats used for water skiing, fishing and other activities. Most of the newer boats sold are purchased by those who tow their boats to lakes or beaches with a car, truck, van or other vehicle. As such towing is at best infrequent, learning to back a vehicle to couple it to the trailer can often be a frustrating and unpleasant experience. Usually, at least two people are required so as to complete the hook-up. One person is required to manipulate the vehicle and the other person is required to observe and relay guidance information to the vehicle operator. An effort to carry out this operation at night or under adverse weather conditions only further exacerbates this difficulty.

Various devices have been created in the past to assist in the backing and coupling process. One prior art example shows an alignment device which utilizes a rear window target strip and a trailer pointer. The pointer, when viewed from the driver's seat, will contact the window target to designate the correct vehicle-trailer alignment. Unfortunately, this setup is not easily transferable between two remote vehicles, since the target strip is permanently attached to the rear window. Another example describes an alignment device for hitching trailers that has "C"-configured clamps at the lower end for each of a trailer hitch ball neck and a trailer tongue socket member. Such a device in all its embodiments provides for a telescoping upright element on each of its hitch and ball neck devices. The device is thus easily subject to damage during use and the design is inherently relatively expensive.

Accordingly, a need remains for a combined hitch ball assembly and alignment accessory for vehicles in order to overcome the above-noted shortcomings. The present invention satisfies such a need by providing a trailer hitch ball alignment assembly that is each to use, durable in design, and reduces the risk of a vehicle operator damaging their automobile and/or trailer. Such an assembly advantageously allows a vehicle operator to easily align their truck, car or van with a trailer, without requiring the help of a second person. The assembly further conveniently allows a user to easily transfer the assembly between any combination of vehicles and trailers. The reflective nature of the identification markers also makes the assembly suitable for use at night time or in reduced light conditions.

BRIEF SUMMARY OF THE INVENTION

In view of the foregoing background, it is therefore an object of the present invention to provide a combined hitch ball assembly and alignment accessory for vehicles. These and other objects, features, and advantages of the invention are provided by an alignment assembly for assisting a vehicle operator to align a trailer hitch with a vehicle hitch while the operator is seated within the vehicle.

The alignment assembly includes first and second identification markers that have elongated shafts provided with axially opposed end portions respectively. Each shaft has a suitable longitudinal length wherein a bottom one of the end portions is situated below an operator's line of sight defined from a rear view mirror of the vehicle. A top one of the end portion is situated within the operator's line of sight such that the operator can effectively and conveniently visually identify a location of the first and second identification markers while seated within the vehicle and looking through the rear view mirror.

Such a first identification marker is directly seated on a rear portion of the vehicle hitch and spaced from a rear bumper of the vehicle. The second identification marker is directly seated on a proximal end of the trailer hitch that is directly conjoined to a distal end of the vehicle hitch. Each of the first and second identification markers has a maximum diameter less than a width of the vehicle and trailer hitches so that the first and second identification markers advantageously and effectively maintain continuous surface area contact therewith.

The first and second identification markers preferably include an annular base member that is provided with a centrally registered aperture traversing therethrough. Such base members confront a top surface of the vehicle and trailer hitches respectively and are directly connected thereto. The base members are advantageously formed from magnetic material which creates an attracting force between the respective top surfaces of the trailer and vehicle hitches for effectively maintaining the first and second identification markers statically conjoined directly thereto.

The first and second identification markers preferably include a push-nut bolt retainer directly abutted against a bottom end of an associated one of the shafts respectively. Such a push-nut bolt retainer has a plurality of flange portions deformably adaptable between compressed and expanded positions for effectively and critically maintaining a fastener engaged with an associated one of the base members such that the associated shaft advantageously does not undesirably detach from the associated base member during operating conditions.

The first and second identification markers may include a target zone directly connected to a top one of the shaft end portions. Such target zones have annular shapes and are formed from reflective material. One of the shafts associated with the second identification marker has a longitudinal length greater than a longitudinal length of another shaft associated with the first identification marker such that one of the target zones associated with the one shaft is completely situated above and rearwardly disposed from another one of the target zones associated with the another shaft. Such shafts maintain a fixed spatial relationship during operating conditions. The base member associated with the one shaft is disposed at a higher elevation than the base member associated with the other shaft.

In an alternate embodiment, the second identification marker may further include a mirror directly conjoined to the shaft thereof. Such a mirror is oriented in such a manner that the vehicle driver seated in the vehicle can advantageously and conveniently visually identify a relative position of the first and second identification markers. A flashlight is directly conjoined to the shaft of the second identification marker. Such a flashlight is vertically registered below the mirror and emits a light array vertically downwardly directly onto a ball section of the vehicle hitch.

A mechanism is included for locking the second identification marker at a static position when seated on the trailer hitch such that the second identification marker becomes securely and effectively attached to the trailer hitch during operating conditions. Such a locking mechanism is spaced from the first identification marker and independently operable therefrom. The vehicle operator can advantageously and conveniently accurately determine when the vehicle and trailer hitches are aligned in a linear relationship by aligning the first and second identification markers in a linear relationship during operating conditions.

The locking mechanism preferably includes a flexible magnetic strip adapted to a non-linear shape that effectively conforms to a contour of an inner surface of the trailer hitch. Such a magnetic strip is directly conjoined to the inner surface and extends along an entire longitudinal length of the trailer hitch. The magnetic strip is directly and removably engageable with a ball section of the vehicle hitch and has a magnetically enhanced connection directly therewith for advantageously and effectively creating a stronger connection between the trailer and vehicle hitches during towing conditions.

A latching member is provided with a lever directly secured thereto. Such a lever has opposed end portions directly connected to a body of the latching member and to an outer edge of the base member of the second identification marker in such a manner that the second identification marker is statically engaged directly to the trailer hitch while the latching member is biased to a locked position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL
VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view showing an identification marker, in accordance with the present invention;

FIG. 2 is a front-elevational view showing an alternate embodiment of the second identification marker, in accordance with the present invention;

FIG. 3 is a side-elevational view showing a combined hitch ball assembly and alignment accessory for vehicles, in accordance with the present invention;

FIG. 4 is a side-elevational view of the assembly shown in FIG. 3, showing the assembly's orientation during operating conditions;

FIG. 5 is an enlarged side-elevational view of section 5 shown in FIG. 4;

FIG. 6 is a top perspective view of the base member shown in FIGS. 1 through 5, showing the aperture passing therethrough;

FIG. 7 is a bottom perspective view of the base member shown in FIG. 1;

FIG. 8 is a side-elevational view of the push-nut bolt shown in FIG. 7;

FIG. 9 is a top plan view of the push-nut bolt shown in FIG. 8; and

DETAILED DESCRIPTION OF THE INVENTION

Figure 10:
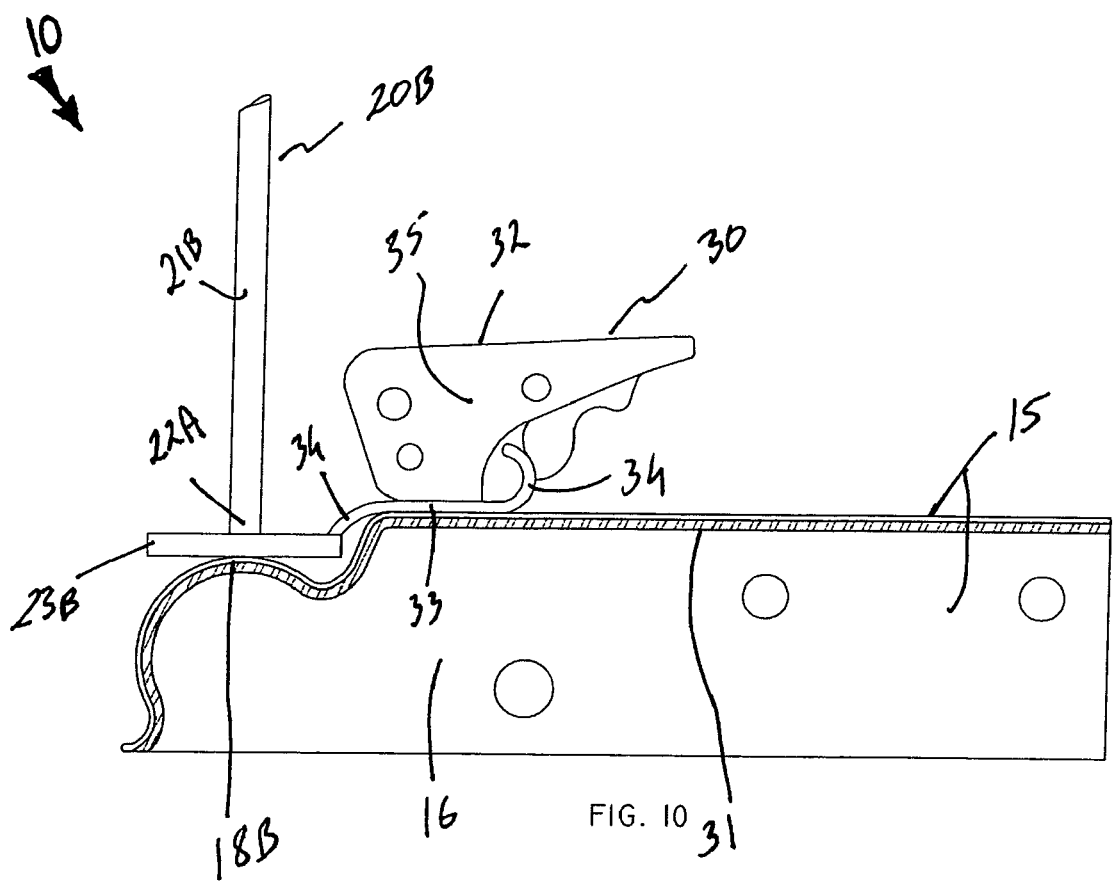
FIG. 10 is a cross-sectional view of the assembly shown in FIG. 5, taken along line 10-10, and showing the flexible magnetic strip attached to the trailer hitch.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime numbers refer to alternate embodiments of such elements.

The assembly of this invention is referred to generally in FIGS. 1-10 by the reference numeral 10 and is intended to provide a combined hitch ball assembly and alignment accessory for vehicles. It should be understood that the apparatus 10 may be used to align many different types of trailers and vehicles and should not be limited in use to only trucks and boat trailers.

Referring initially to FIGS. 1, 3, 45, 7 and 10, the assembly 10 includes first 20A and second 20B identification markers 20 that have elongated shafts 21 provided with axially opposed end portions 22 respectively. Each shaft 21 has a suitable longitudinal length wherein a bottom one 22A of the end portions 22 is situated below an operator's line of sight defined from a rear view mirror of the vehicle 11. Of course, the shafts 21 may be adjustable in length for effectively adapting to alternate lines of sight associated with a variety of vehicles, as is obvious to a person of ordinary skill in the art. A top one 22B of the end portions 22 is situated within the operator's line of sight such that the operator can effectively and conveniently visually identify a location of the first 20A and second 20B identification markers while seated within the vehicle and looking through the rear view mirror.

Referring to FIGS. 3, 4 and 5, such a first identification marker 20A is directly seated, without the use of intervening elements, on a rear portion 13 of the vehicle hitch 12 and spaced from a rear bumper 14 of the vehicle 11. The second identification marker 20B is directly seated, without the use of intervening elements, on a proximal end 16 of the trailer hitch 15 that is directly conjoined, without the use of intervening elements, to a distal end 17 of the vehicle hitch 12. Each of the first 20A and second 20B identification markers has a maximum diameter less than a width of the vehicle 12 and trailer 15 hitches, which is essential and advantageous so that the first 20A and second 20B identification markers effectively maintain continuous surface area contact therewith.

Referring to FIGS. 1, and 3 through 10, the first 20A and second 20B identification markers include an annular base member 23 that is provided with a centrally registered aperture 24 traversing therethrough. Such base members 23 confront a top surface 18A, 18B of the vehicle 12 and trailer 15 hitches respectively and are directly connected thereto, without the use of intervening elements. The base members 23 are advantageously formed from magnetic material which is crucial for creating an attracting force between the respective top surfaces 18B, 18A of the trailer 15 and vehicle 12 hitches that are vital for effectively maintaining the first 20A and second 20B identification markers statically conjoined directly thereto, without the use of intervening elements.

The magnetic nature of the base members 23 further advantageously allow the assembly 10 to be easily transferred among any combination of a variety of vehicles 11 and their associated trailer. The first 20A and second 20B identification markers include a push-nut bolt retainer 25 directly abutted against a bottom end 22A of each one of the shafts 21 respectively, as is best shown in FIGS. 7, 8 and 9. Such a push-nut bolt retainer 25 has a plurality of flange portions 26 that are deformably adaptable between compressed and expanded positions, which is important for effectively and critically maintaining a fastener 25 engaged with an associated one of the base members 23 such that the associated shaft 21 advantageously does not undesirably detach from the associated base member 23 during operating conditions.

Referring to FIGS. 1, 2 and 4, the first 20A and second 20B identification markers include a target zone 27 directly connected, without the use of intervening elements, to a top one 22B of the shaft end portions. Such target zones 27 have annular shapes and are formed from reflective material, which is vital for advantageously allowing same to be visible in low light conditions often experienced during early morning and late night hours. Of course, the target zones 27 may be alternately shaped, as is obvious to a person of ordinary skill in the art. One of the shafts 21B associated with the second identification marker 20B has a longitudinal length greater than a longitudinal length of another shaft 21A associated with the first identification marker 20A, which is an essential feature such that one 27B of the target zones 27 associated with the one shaft 21B is completely situated above and rearwardly disposed from another one 27A of the target zones 27 associated with the another shaft 21A. Such shafts 21 maintain a fixed spatial relationship during operating conditions. The base member 23B associated with the one shaft 21B is disposed at a higher elevation than the base member 23A associated with the other shaft 21A, as is best shown in FIGS. 3, 4 and 5.

Referring to FIG. 2, in an alternate embodiment 10', the second identification marker 20B' further includes a mirror 28 directly conjoined, without the use of intervening elements, to the shaft 21B' thereof. Such a mirror 28 is oriented in such a manner that the vehicle driver seated in the vehicle 11 can advantageously and conveniently visually identify a relative position of the first 20A and second 20B identification markers. A flashlight 29 is directly conjoined, without the use of intervening elements, to the shaft 21B of the second identification marker 20B. Such a flashlight 29 is vertically registered below the mirror 28 and emits a light array vertically downwardly directly onto a ball section 19 of the vehicle hitch 12, which is critical for allowing a vehicle operator to more easily observe the connection between the vehicle 12 and trailer 15 hitches during reduced light conditions.

Referring to FIGS. 3, 4, 5 and 10, a mechanism 30 is included for locking the second identification marker 20B at a static position when seated on the trailer hitch 15, which is important such that the second identification marker 20B becomes securely and effectively attached to the trailer hitch 15 during operating conditions. Such a locking mechanism 30 is spaced from the first identification marker 20A and independently operable therefrom. The vehicle operator can advantageously and conveniently accurately determine when the vehicle 12 and trailer 15 hitches are aligned in a linear relationship by effectively aligning the first 20A and second 20B identification markers in a linear relationship during operating conditions. The locking mechanism 30 includes a flexible magnetic strip 31 adapted to a non-linear shape that effectively conforms to a contour of an inner surface of the trailer hitch 15, as is best shown in FIG. 10.

Still referring to FIGS. 3, 4, 5 and 10, such a magnetic strip 31 is directly conjoined, without the use of intervening elements, to the inner surface and extends along an entire longitudinal length of the trailer hitch 15. The magnetic strip 31 is directly and removably engageable with a ball section 19 of the vehicle hitch 12 and has a magnetically enhanced connection directly therewith, without the use of intervening elements, which is essential and advantageous for effectively creating a stronger connection between the trailer 15 and vehicle 12 hitches during towing conditions.

A latching member 32 is provided with a lever 33 directly secured, without the use of intervening elements, thereto. Such a lever 33 has opposed end portions 34 directly connected, without the use of intervening elements, to a body 35 of the latching member 32 and to an outer edge of the base member 23B of the second identification marker 20B in such a manner that the second identification marker 20B is statically engaged directly, without the use of intervening elements, to the trailer hitch 15 while the latching member 32 is biased to a locked position.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An alignment assembly for assisting a vehicle operator to align a trailer hitch with a vehicle hitch while the operator is seated within the vehicle, said alignment assembly comprising:

first and second identification markers having elongated shafts provided with axially opposed end portions respectively, said first identification marker being directly seated on a rear portion of the vehicle hitch and spaced from a rear bumper of the vehicle, said second identification marker being directly seated on a proximal end of the trailer hitch that is directly conjoined to a distal end of the vehicle hitch; and means for locking said second identification marker at a static position when seated on the trailer hitch such that said second identification marker becomes securely attached to the trailer hitch during operating conditions;

wherein the vehicle operator can accurately determine when the vehicle and trailer hitches are aligned in a linear relationship by aligning said first and second identification markers in a linear relationship during operating conditions;

wherein each said first and second identification markers comprises a target zone directly connected to a top one of said shaft end portions, said target zones having annular shapes and being formed from reflective material;

wherein one said shafts associated with said second identification marker has a longitudinal length greater than a longitudinal length of another said shafts associated with said first identification marker such that one said target zones associated with said one shaft is completely situated above and rearwardly disposed from another said target zones associated with said another shaft, said shafts maintaining a fixed spatial relationship during operating conditions, said base member associated with said one shaft being disposed at a higher elevation than said base member associated with said another shaft;

wherein said second identification marker further comprises a mirror directly conjoined to one said shafts thereof, said mirror being oriented in such a manner that the vehicle driver seated in the vehicle can visually identify a relative position of said first and second identification markers; and a flashlight directly conjoined to said one shaft of said second identification marker, said flashlight being vertically registered below said mirror and emitting a light array vertically downwardly directly onto a ball section of the vehicle hitch.

2. The assembly of claim 1, wherein each said first and second identification markers comprises:

an annular base member provided with a centrally registered aperture traversing therethrough, said base members confronting a top surface of the vehicle and trailer hitches respectively and being directly connected thereto, said base members being formed from magnetic material and creating an attracting force between the respective top surfaces of the trailer and vehicle hitches for maintaining said first and second identification markers statically conjoined directly thereto.

3. The assembly of claim 1, wherein said locking means comprises:

a flexible magnetic strip adapted to a non-linear shape and conforming to a contour of an inner surface of the trailer hitch, said magnetic strip being directly conjoined to said inner surface and extending along an entire longitudinal length of the trailer hitch, said magnetic strip being directly and removably engageable with a ball section of the vehicle hitch and having a magnetically enhanced connection directly therewith for creating a stronger connection between the trailer and vehicle hitches during towing conditions; and a latching member provided with a lever directly secured thereto, said lever having opposed end portions directly connected to a body of said latching member and to an outer edge of said base member of said second identification marker in such a manner that said second identification marker is statically engaged directly to the trailer hitch while said latching member is biased to a locked position.

4. The assembly of claim 1, wherein each said first and second identification markers comprises:

a push-nut bolt retainer directly abutted against a bottom one of an associated one of said shafts respectively, said push-nut bolt retainer having a plurality of flange portions deformably adaptable between compressed and expanded positions for effectively and critically maintaining a fastener engaged with an associated one of said base members such that said associated shaft does not undesirably detach from said associated base member during operating conditions.

5. An alignment assembly for assisting a vehicle operator to align a trailer hitch with a vehicle hitch while the operator is seated within the vehicle, said alignment assembly comprising:

first and second identification markers having elongated shafts provided with axially opposed end portions respectively, said first identification marker being directly seated on a rear portion of the vehicle hitch and spaced from a rear bumper of the vehicle, said second identification marker being directly seated on a proximal end of the trailer hitch that is directly conjoined to a distal end of the vehicle hitch;

wherein each said first and second identification markers has a maximum diameter less than a width of the vehicle and trailer hitches so that said first and second identification markers maintain continuous surface area contact therewith; and means for locking said second identification marker at a static position when seated on the trailer hitch such that said second identification marker becomes securely attached to the trailer hitch during operating conditions;

wherein the vehicle operator can accurately determine when the vehicle and trailer hitches are aligned in a linear relationship by aligning said first and second identification markers in a linear relationship during operating conditions;

wherein said locking means comprises a flexible magnetic strip adapted to a non-linear shape and conforming to a contour of an inner surface of the trailer hitch, said magnetic strip being directly conjoined to said inner surface and extending along an entire longitudinal length of the trailer hitch, said magnetic strip being directly and removably engageable with a ball section of the vehicle hitch and having a magnetically enhanced connection directly therewith for creating a stronger connection between the trailer and vehicle hitches during towing conditions; and a latching member provided with a lever directly secured thereto, said lever having opposed end portions directly connected to a body of said latching member and to an outer edge of said base member of said second identification marker in such a manner that said second identification marker is statically engaged directly to the trailer hitch while said latching member is biased to a locked position.

6. The assembly of claim 5, wherein each said first and second identification markers comprises:

an annular base member provided with a centrally registered aperture traversing therethrough, said base members confronting a top surface of the vehicle and trailer hitches respectively and being directly connected thereto, said base members being formed from magnetic material and creating an attracting force between the respective top surfaces of the trailer and vehicle hitches for maintaining said first and second identification markers statically conjoined directly thereto.

7. The assembly of claim 5, wherein each said first and second identification markers comprises:

a target zone directly connected to a top one of said shaft end portions, said target zones having annular shapes and being formed from reflective material;

wherein one said shafts associated with said second identification marker has a longitudinal length greater than a longitudinal length of another said shafts associated with said first identification marker such that one said target zones associated with said one shaft is completely situated above and rearward disposed from another said target zones associated with said another shaft, said shafts maintaining a fixed spatial relationship during operating conditions, said base member associated with said one shaft being disposed at a higher elevation than said base member associated with said another shaft.

8. The assembly of claim 7, wherein said second identification marker further comprises:

a mirror directly conjoined to one said shafts thereof, said mirror being oriented in such a manner that the vehicle driver seated in the vehicle can visually identify a relative position of said first and second identification markers; and a flashlight directly conjoined to said one shaft of said second identification marker, said flashlight being vertically registered below said mirror and emitting a light array vertically downwardly directly onto a ball section of the vehicle hitch.

9. The assembly of claim 5, wherein each said first and second identification markers comprises:

a push-nut bolt retainer directly abutted against a bottom one of an associated one of said shafts respectively, said push-nut bolt retainer having a plurality of flange portions deformably adaptable between compressed and expanded positions for effectively and critically maintaining a fastener engaged with an associated one of said base members such that said associated shaft does not undesirably detach from said associated base member during operating conditions.

10. An alignment assembly for assisting a vehicle operator to align a trailer hitch with a vehicle hitch while the operator is seated within the vehicle, said alignment assembly comprising:

a first and second identification markers having elongated shafts provided with axially opposed end portions respectively, said first identification marker being directly seated on a rear portion of the vehicle hitch and spaced from a rear bumper of the vehicle, said second identification marker being directly seated on a proximal end of the trailer hitch that is directly conjoined to a distal end of the vehicle hitch;

wherein each said first and second identification markers has a maximum diameter less than a width of the vehicle and trailer hitches so that said first and second identification markers maintain continuous surface area contact therewith; and means for locking said second identification marker at a static position when seated on the trailer hitch such that said second identification marker becomes securely attached to the trailer hitch during operating conditions, wherein said locking means is spaced from said first identification marker and independently operable therefrom;

wherein the vehicle operator can accurately determine when the vehicle and trailer hitches are aligned in a linear relationship by aligning said first and second identification markers in a linear relationship during operating conditions;

wherein said locking means comprises a flexible magnetic strip adapted to a non-linear shape and conforming to a contour of an inner surface of the trailer hitch, said magnetic strip being directly conjoined to said inner surface and extending along an entire longitudinal length of the trailer hitch, said magnetic strip being directly and removably engageable with a ball section of the vehicle hitch and having a magnetically enhanced connection directly therewith for creating a stronger connection between the trailer and vehicle hitches during towing conditions; and a latching member provided with a lever directly secured thereto, said lever having opposed end portions directly connected to a body of said latching member and to an outer edge of said base member of said second identification marker in such a manner that said second identification marker is statically engaged directly to the trailer hitch while said latching member is biased to a locked position.

11. The assembly of claim 10, wherein each said first and second identification markers comprises:

an annular base member provided with a centrally registered aperture traversing therethrough, said base members confronting a top surface of the vehicle and trailer hitches respectively and being directly connected thereto, said base members being formed from magnetic material and creating an attracting force between the respective top surfaces of the trailer and vehicle hitches for maintaining said first and second identification markers statically conjoined directly thereto.

12. The assembly of claim 10, wherein each said first and second identification markers comprises:

a target zone directly connected to a top of said shaft end portions, said target zones having annular shapes and being formed from reflective material;

wherein one said shafts associated with said second identification marker has a longitudinal length greater than a longitudinal length of another said shafts associated with said first identification marker such that one said target zones associated with said one shaft is completely situated above and rearward disposed from another said target zones associated with said another shaft, said shafts maintaining a fixed spatial relationship during operating conditions, said base member associated with said one shaft being disposed at a higher elevation than said base member associated with said another shaft.

13. The assembly of claim 12, wherein said second identification marker further comprises:

a mirror directly conjoined to one said shafts thereof, said mirror being oriented in such a manner that the vehicle driver seated in the vehicle can visually identify a relative position of said first and second identification markers; and a flashlight directly conjoined to said one shaft of said second identification marker, said flashlight being vertically registered below said mirror and emitting a light array vertically downwardly directly onto a ball section of the vehicle hitch.

14. The assembly of claim 10, wherein each said first and second identification markers comprises:

a push-nut bolt retainer directly abutted against a bottom one of an associated one of said shafts respectively, said push-nut bolt retainer having a plurality of flange portions deformably adaptable between compressed and expanded positions for effectively and critically maintaining a fastener engaged with an associated one of said base members such that said associated shaft does not undesirably detach from said associated base member during operating conditions.

* * * * *